(12) United States Patent  (10) Patent No.: US 8,181,385 B2
Mars  (45) Date of Patent: May 22, 2012

(54) PORTABLE ELECTRONIC LIGHTED INSECT ZAPPER

(76) Inventor: James R. Mars, Hartland, WI (US)

( * ) Notice: Subject to any disclaimer, the term of this patent is extended or adjusted under 35 U.S.C. 154(b) by 0 days.

(21) Appl. No.: 12/653,370

(22) Filed: Dec. 12, 2009

(65) Prior Publication Data

US 2010/0088947 A1 Apr. 15, 2010

Related U.S. Application Data

(63) Continuation-in-part of application No. 12/006,783, filed on Jan. 7, 2008, now abandoned.

(60) Provisional application No. 60/879,239, filed on Jan. 9, 2007.

(51) Int. Cl.
*A01M 1/22* (2006.01)
*A01M 3/02* (2006.01)

(52) U.S. Cl. .............................. 43/112; 43/132.1; 43/137

(58) Field of Classification Search .................... 43/107, 43/112, 124, 132.1, 137; *A01M 1/22, 3/02*
See application file for complete search history.

(56) References Cited

U.S. PATENT DOCUMENTS

| 1,848,614 | A | * | 3/1932 | Folmer et al. | .................... | 43/112 |
| 2,141,454 | A | * | 12/1938 | Sudlow | .......................... | 119/652 |
| 2,881,554 | A | | 4/1959 | Laine | | |
| 2,951,310 | A | | 9/1960 | Anderston | | |
| 3,473,251 | A | | 10/1969 | Kahn | | |
| 3,673,730 | A | | 7/1972 | Hegenberger | | |
| 3,789,537 | A | | 2/1974 | Rule | | |
| 5,205,064 | A | * | 4/1993 | Nolen | .............................. | 43/112 |
| 5,519,963 | A | * | 5/1996 | Shih | ............................... | 43/137 |
| 5,533,298 | A | | 7/1996 | Teng | | |
| 2002/0112394 | A1 | * | 8/2002 | Meade et al. | .................... | 43/112 |
| 2002/0178649 | A1 | | 12/2002 | Betzen | | |
| 2007/0101639 | A1 | * | 5/2007 | Huang | ............................. | 43/112 |
| 2007/0271839 | A1 | * | 11/2007 | Su | ...................................| 43/112 |
| 2009/0272026 | A1 | * | 11/2009 | Su | ...................................| 43/137 |
| 2009/0277073 | A1 | * | 11/2009 | Chen | ............................... | 43/112 |
| 2010/0132247 | A1 | * | 6/2010 | Borovicka et al. | .............. | 43/137 |
| 2010/0162615 | A1 | * | 7/2010 | Keralla | ........................... | 43/112 |

FOREIGN PATENT DOCUMENTS

JP 2002281882 A * 10/2002

OTHER PUBLICATIONS

English Translation of JP patent 2002-281882.*

* cited by examiner

*Primary Examiner* — Kimberly Berona
*Assistant Examiner* — Marisa Conlon
(74) *Attorney, Agent, or Firm* — Ryan, Kromholz & Manion, S.C.

(57) ABSTRACT

An insect destroying device is battery operated and shaped somewhat like a squash or tennis racquet in order to provide a wide opening to enable insects to make contact with one of two outer grids and an inner grid. Both a manual and static technique is provided for enabling contact with insects while destroying them. An uppermost portion of the housing includes an open area in which a narrow strip of central grid is exposed adjacent two ground grids to enable exposure to an insect discovered along the corner between the wall and the ceiling, or where the wall meets a wall at a 90 degree angle, or between the wall and the floor where it is very difficult to have the insect make contact with the center grid or ground grids through the main openings of the grid support area.

8 Claims, 4 Drawing Sheets

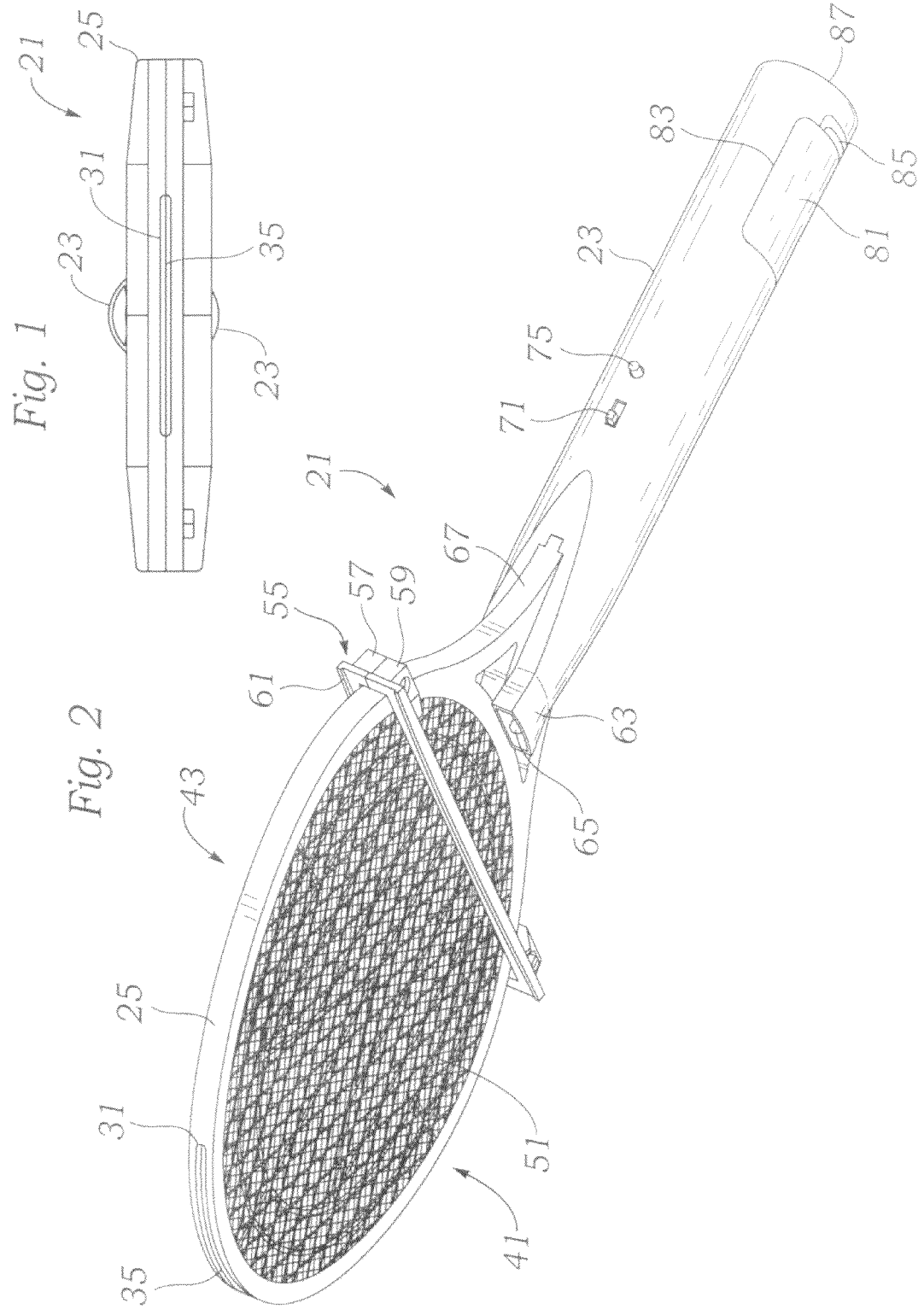

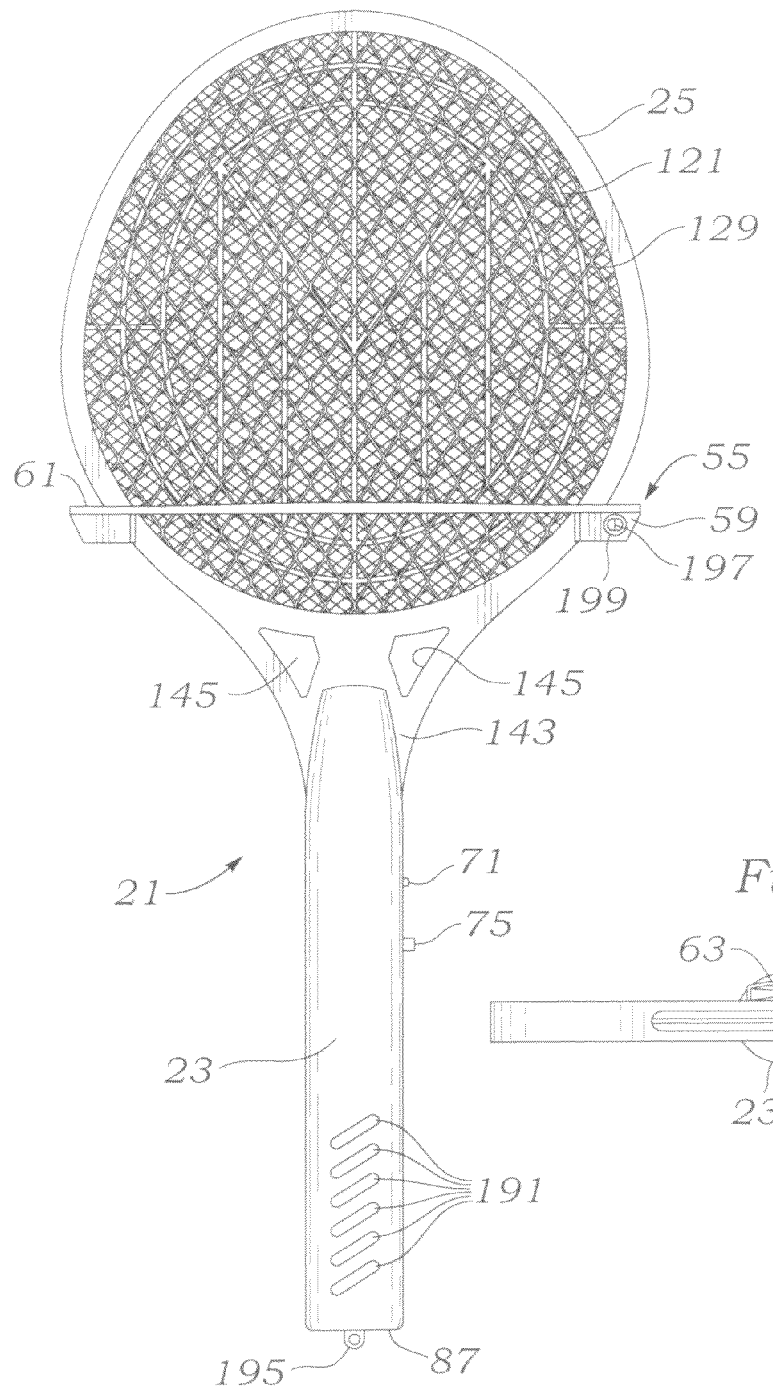

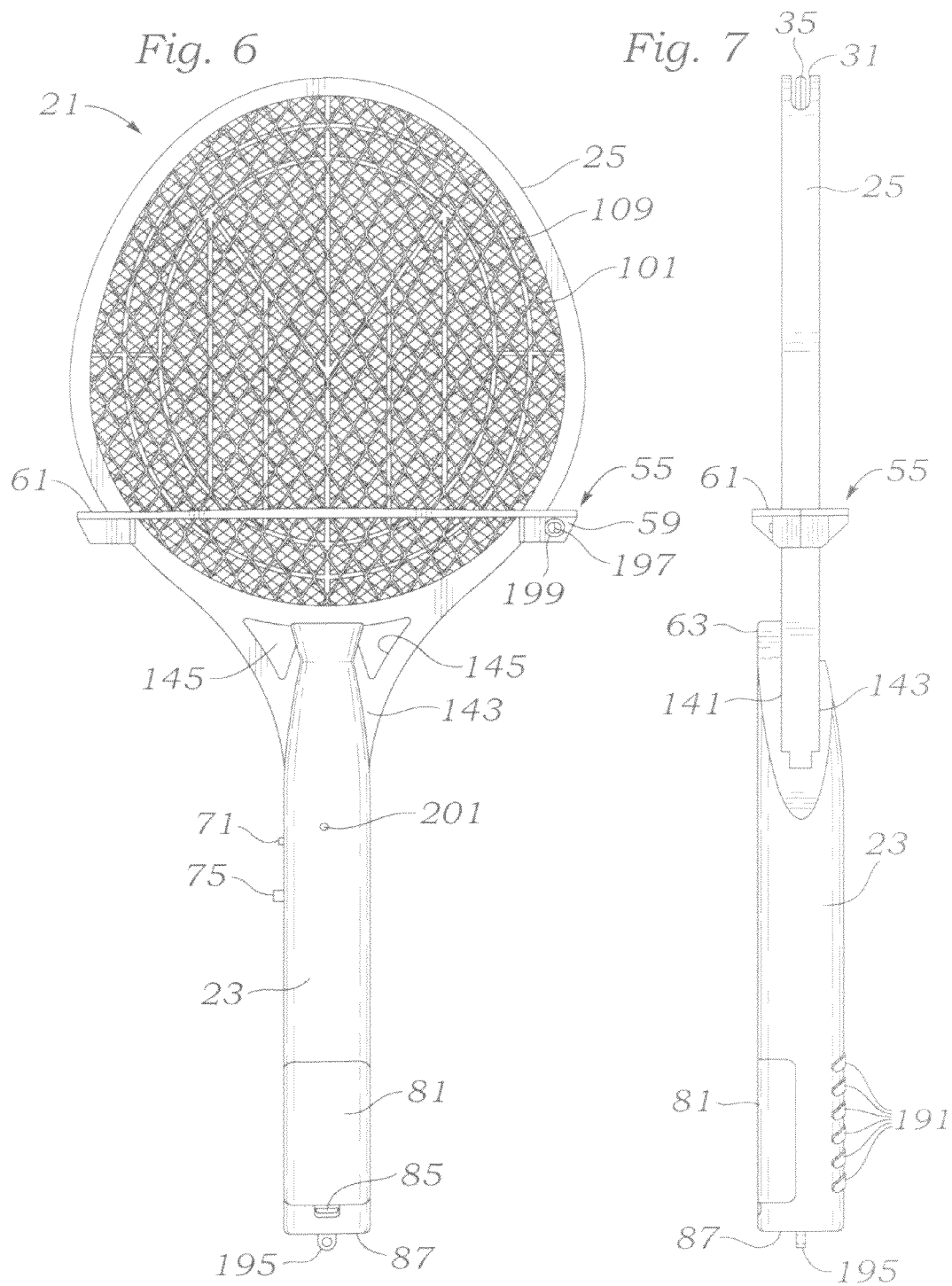

PORTABLE ELECTRONIC LIGHTED INSECT ZAPPER

This application is a continuation-in-part application of U.S. patent application Ser. No. 12/006,783 filed Jan. 7, 2008, now abandoned which was a continuation of then U.S. Provisional Patent Application No. 60/879,239 filed Jan. 9, 2007.

FIELD OF THE INVENTION

This invention relates to a portable device for destroying flying insects without causing marred walls and without having to either crush the insect in a corner nor having to bring a vacuum to try and extract the insect from the corner area by providing a light weight, easily manipulatable device to gently kill insects with electric shock.

BACKGROUND OF THE INVENTION

Insects within an indoor room, particularly in a bedroom at night, can cause loss of sleep and distraction for room occupants. Generally, insects which are indoor commercial or residential area are unwanted pests. A number of well known and effective methods for dealing with insects are known. Some of these devices have fixed structures to attract the insect and lure them into a trap or to lure them into a position where they will be electrocuted and collected. These types of devices can have serious consequences where children have access to them.

For small trap and capture devices, children are exposed to germs, shock and heat. They have moving parts and are easily opened. In the case of high voltage alternating current killing devices, they are usually hung a sufficient height so that they will be outside the reach of children. In many cases they are encased by a wire mesh grounded grid to try and insure that shock will not occur upon inadvertent touching of the enclosure.

High voltage alternating current devices may be accompanied by an ultraviolet light source to attract insects from a relatively long distance. Because these alternating current devices have high voltage, large, well separated grids, the electrocution of insects is accompanied by sound and light effects. The effects most often are a loud pop, followed by a flash or burst of light as the insect is either electrically heated to the point of burning or where the insect provides a conductive conduit for an electrical arcing between the electrodes which may have been started by current flow through the insect. As a result, this type of high alternating current voltage device finds application in a commercial environments where it can be well out of reach of people and where noise and falling insect parts are not out of place.

However, both of the aforementioned conventional devices are fixed and require the insect to come to the device, and none of the aforementioned devices are designed so that they can be moved or manipulated. Where a person encounters a flying insect and wishes to kill the insect or capture it, there are few alternatives available. Portable bug vacuums are known, but may lack the power and air flow to enable ease of capture. The use of conventional high suction vacuum cleaners is similarly difficult in having to lift, carry and make electrical power connection to the area in which the insect is located.

SUMMARY OF THE INVENTION

A battery operated, tennis racquet shaped insect zapper device includes a grid support area having an opening on either side of the racquet to allow a variety of manual and static techniques for enabling contact with insects while destroying them. A handle portion of the tennis racquet shaped device holds two "D" sized batteries adjacent the end of the handle opposite the grid support area so that for manual usage, the user can grasp the tennis racquet shaped device near its center of gravity for the ability to effortlessly angularly change the position of the tennis racquet shaped insect zapper device to cause flying insects to come into contact with a separated grid set held in a grid support portion of the insect zapper device.

The grid support portion of the insect zapper device has a pair of opposite openings to enable the insect zapper device to be waved through the air with minimum resistance much like a tennis racquet. The separated grid set is selected for minimum air resistance in a direction normal to the grid set, yet with an average open space which can bring the extremities of an insect into contact with a ground grid and a central grid so that electrically conductive killing contact can be made between the ground grid and central grid through the insect to cause destruction of the insect.

The central grid is separated to either side from a pair of ground grids located on either side, by a separation dielectric which may be formed with the central grid so that the central grid will have an extended standoff structure to either side. The central grid can be provided in an injection mold so that areas of the central grid which are engaged by the extended standoff structure occupy minimal areas of the central grid.

Further, an uppermost portion of the housing, includes an open area in which a narrow strip of central grid is exposed. Still adjacent the central grid but separated from it, a pair of edge plate surfaces associated with the ground grids can enable insects near the upper end of the housing to contact both the central grid and the ground plates to make electrical contact to destroy the insect.

As a result the insect zapper apparatus works fine for electrocuting insects of all types especially when they are flying. By placing the racquet shaped housing over a landed flying insect, contact will be made when the insect tries to fly between the wires or when he walks or moves onto the central grid electrode. When the insect is along the corner between the wall and the ceiling, or where the wall meets a wall at a 90 degree angle, or between the wall and the floor, it is very difficult to have the insect make contact with the center grid or ground grids through the main openings of the grid support area. This eliminates the frustration the user is confronted with when trying to kill a landed insect that is in a corner or on a window between the glass and the a frame.

The open area at the uppermost portion of the housing exposes the center electric potential carrying grid. Two round flexible safety bars at that far end adjacent and separated from the center electric potential carrying grid will allow insects to be electrified and destroyed when the upper housing is placed directly toward the insect. The approach may be into a corner or even perpendicular to the surface that the insect is sitting upon. This capability gives the ability to kill bugs at the end of the housing of the insect zapper.

The insect zapper may have a central grid having a parallelogram shaped mesh opening of about four millimeters wide, and ground grids of a parallelogram shape having a width of about one centimeter wide. The openings of both parallelogram shapes of both the ground grids and the central grid may have a repeating diamond shape. The resulting wire thickness forming the repeating diamond shapes may preferably be about 0.5 millimeters for the ground grids and about 0.33 millimeters for the central grid. The mesh may be made from 16 gauge steel.

In the embodiments recited, the insect zapper can be used to kill insects when they are sitting or walking in those corners by making contact with the end of the tennis racquet. When the sitting or crawling insect is on the ceiling, using the end of the insect zapper will make it very simple to contact and destroy the insect. The user need not climb on a ladder to lay insect zapper flush with the ceiling. The open end design allows for the positioning of the insect zapper in both tight corners and in a perpendicular approach to an insect on a flat surface.

The voltage utilized is sufficient to destroy the insects and make a confirmatory sound, but not so high as to be annoying. However, this relatively low level noise allows the user to not only swing the insect zapper but also to gently approach the insect with a very slow movement until a zap sound is heard and the insect is killed.

The insect zapper of the invention has two optional features which provide a facility of use in two other modes of utilization. First, it as an attachable and detachable bait tray which is a structure providing a surface immediately in front of the ground grids, onto which an insect bait can be placed. Placement can be accomplished by either applying a smear of bait directly onto the tray, or the tray can be used as a support for other bait structures, such as paper or foil or clips or other quick attachment where a quick change of baits is desired. Also by using the method of baiting the perimeter of the grid openings, meat and fruit eating insects will be more directly drawn to the grid opening area where the insects will come in contact with the metal grid and be killed.

A further significant improvement to the insect zapper of the invention is the provision of an LED light which is aimed in the direction of the grid opening area on one side. The LED light allows the insect zapper apparatus to draw the insects to it when the overall environment is dark to increase the chance that they will bee killed by the ground grids and center grid. The LED light should have an output which tends somewhat toward the ultraviolet frequency spectrum in order to preferentially attract insects. At night when an insect is detected, the user has the option to grasp the insect zapper device and switch on the light to locate the insect. This low light source on the insect zapper has two benefits. First, the main lights may not have to be turned on to locate the insect. Where the user is awakened by insect noise, the insect zapper can be grasped and its LED switched on. Any area in which the insect zapper is pointed will be gently illuminated. The illumination level is sufficient to locate the insect and bring him into contact with the insect zapper, either laterally into the grid support openings, or at the uppermost end of the housing, at the open area at which a narrow strip of central grid is exposed.

Also, the LED light can be left on while the insect zapper is not being manipulated. The position of the LED in aiming toward the upper end of the insect zapper also acts to illuminate the metallic ground grid, and to a less extent the central grid and to a lesser extend the metallic ground grid on the opposite side of the insect zapper than the side the light is mounted. This acts to illuminate the grid opening and to make, depending upon the angle of incidence, makes the light source and the ground grid appear as a light source which will attract flying insects. This enables the insect zapper to be left on, and supported in any position to act as a flying insect attractive insect destroying device.

The portability of the insect zapper allows it to be used indoors in the event mosquitoes or other insects have entered the home or work place or outdoors. The 2400 volt electrode provides sufficient vaporization of insects so that the grids stay clean.

Mosquitoes carry many diseases and some people are allergic to being stung by bees and other insects. This apparatus can eliminate thousands of these insects and done without the use of pesticides, possibly allowing dead insects to be eaten by other animals or birds without harm.

Also by putting bait such as meat, fish, fish bait etc onto the bait shelves, the flies, bees, hornets and other insects that are attracted to the bait will be electrocuted when they make contact with the electrode. When the insect zapper is hung from a branch of a tree or any other support located above the ground and the two position switch is turned on, the insects will drop onto the shelf and onto the ground after they have been electrified. Birds can now eat these insects that have been killed without the use of chemicals. This same baiting technique works well when placed behind or laid flat under appliances for the purpose of attracting cockroaches, spiders and ants.

BRIEF DESCRIPTION OF THE DRAWINGS

The invention, its configuration, construction, and operation will be best further described in the following detailed description, taken in conjunction with the accompanying drawings in which:

FIG. 1 is an end view of a first embodiment of the device and illustrating a narrow slot at the top end of the insect zapper which makes a central grid and ground grids located to the side available for touching by an insect;

FIG. 2 is a perspective view of a second embodiment of the insect zapper and illustrating an optionally attachable bait tray, and an integrally mounted light emitting diode directed toward the grid assembly;

FIG. 4 is a plan view of the insect zapper seen in FIGS. 2 and 3 shown with bait support structure and a hand grip;

FIG. 5 is a rear view of the insect zapper seen in FIGS. 2-4 and emphasizing the open narrow slot 31, as well as the profile of the light emitting diode;

FIG. 6 is a front view of the insect zapper seen in FIGS. 2-5 and emphasizing the battery door and a power indicator light; and FIG. 7 is a right side view of the insect zapper seen in FIGS. 2-6 and showing the symmetrical extent of the bait support.

DETAILED DESCRIPTION OF THE PREFERRED EMBODIMENTS

Figure 3:
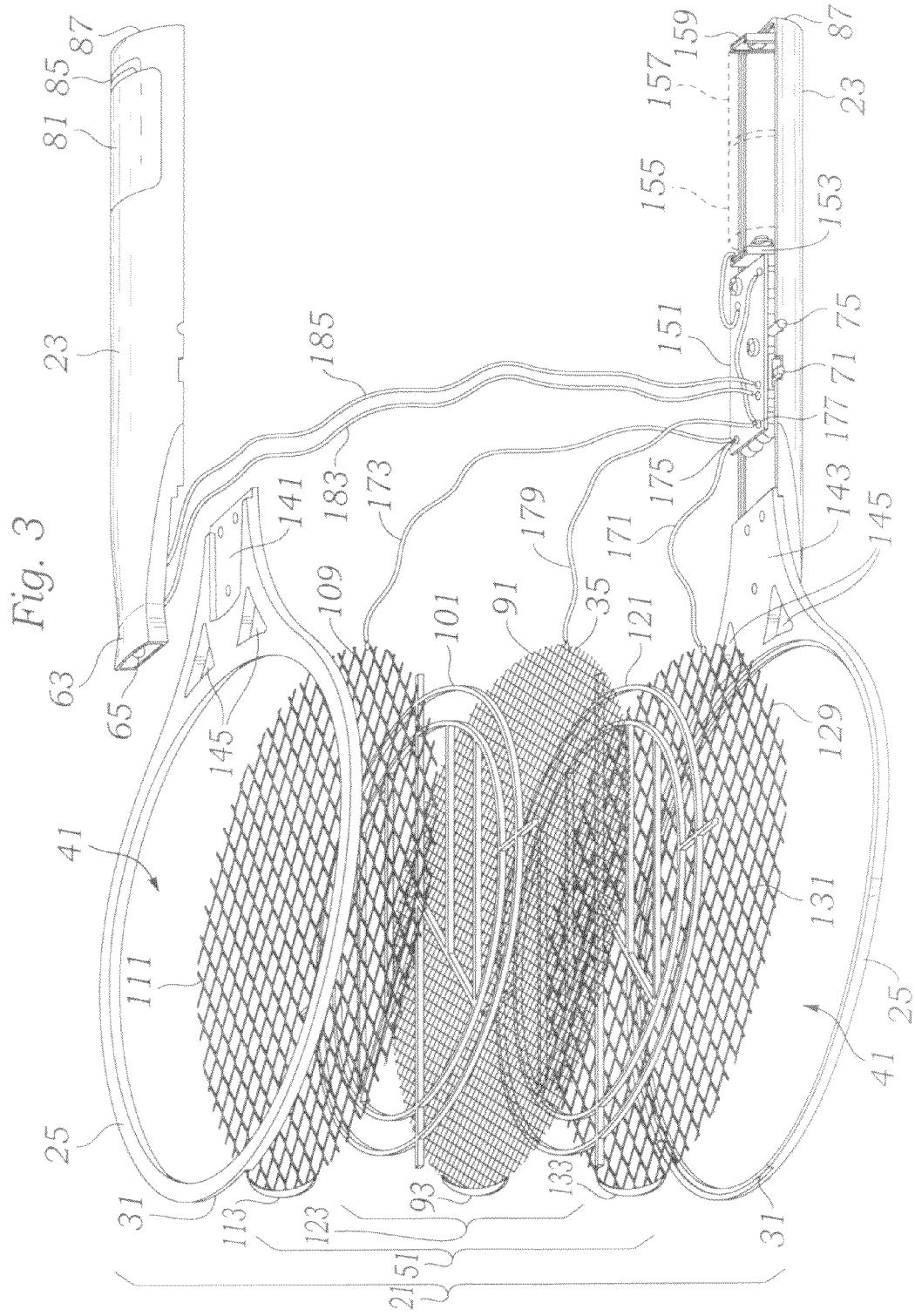
FIG. 3 is an exploded view of the insect zapper seen in FIG. 2 and illustrating further details of the internals and grid assembly.

FIG. 1 is an end view of a first embodiment of the insect zapper device of the invention, and illustrates an end view of a first embodiment of the insect zapper 21 having a handle 23 and a grid support portion 25. As can be seen, the grid support portion 25 need not be centered with respect to the handle 23. A narrow slot 31 is seen. A center grid 35 is seen by its upper end edge generally at the center of the slot 31. Not seen in FIG. 1 are the ground grids which lie to either side of the center grid 35 just inside the slot 31. The slot 31 may have the same size gap that each of each of the grid squares (not seen in FIG. 1) may have. An insect which contacts the center grid 35 will likely also come into some contact with one or both of the ground grids and be electrocuted and destroyed.

Referring to FIG. 2, a perspective view of a second embodiment of the insect zapper 21 of the invention illustrates the overall shape and also illustrates further details. Structures not seen in FIG. 1 include, from the left, a first grid support opening 41 shown as an up sweeping arrow, and a second grid support opening 43 shown by a down sweeping arrow. Within the first and second grid support openings 41 and 43, a grid assembly 51 is supported. Further details of the grid assembly will are to be shown.

About three quarters along the grid assembly toward the handle 23, a bait support structure 55 is seen. The bait support structure 55 may be provided as a pair of halves which may or may not be identical, including a first half 57 and a second half 59 which can come together at a stable position with respect to the shape and curvature of the grid support portion 25 to avoid having to provide specialized support structures either on the grid support portion 25 or between the bait support structure 55 and any other structure.

The bait support structure 55 provides a narrow tray with a raised rail 61 on both of the first and second halves 57 and 59 to help smear on a bait material (not shown). As to the bait support structure 55 shown, each of the first and second halves 57 and 59 attach to each other when positioned such that internal depressions (not shown) engage the opposite surfaces of the grid support portion 25. In a like manner, the bait support structure 55 shown can be removed by unsnapping the first and second halves 57 and 59 from each other. In addition, this enables the bait support structure 55 to be separated from the overall insect zapper 21 so that the bait support structure 55 can be washed, well away from the grid assembly 51 and grid support portion 25.

On the underside of the insect zapper 21 shown, a light housing 63 supports a light emitting diode (LED) 65 in a position directed toward the end of the grid support portion 25 adjacent the slot 31. The led 65 is directed to spread light broadly across the grid assembly 51, as well as to project beyond the end of the grid support portion 25. The light housing 63 shown is integral with the handle 23, but need not be.

The grid support portion 25 blends inwardly to a neck portion 67 which then blends into handle 23. A slide switch 71 is seen next to a push in/push out actuation button 75. The slide switch 71 energizes the LED 65. The push in/push out actuation button 75 energies the grid assembly 51 to enable the insect zapper 21 to destroy insects. The LED 65 and grid assembly 51 may each be powered independently of the other. As a result, the insect zapper 21 can be used to provide light, or to destroy insects, or both. Further, both the LED 65 and grid assembly 51 can be energized for use of the insect zapper 21 manually or in a position of rest where it can attract insects passively and destroy them.

Near the end of the handle 23, a battery door 81 secures a battery opening 83. Battery door 81 may use a levered snap 85 to engage with the body of the handle 23 to secure the battery door 81. The batteries would preferably be two "D" size and (not shown in FIG. 2) would lie behind the battery door 81 with one of the batteries lying partially beyond the battery door 81 in a direction opposite a butt end 87 of the insect zapper 21, as will be shown. The location of batteries close to the butt end 87 enables a good balance when the handle 23 is grasped between the push in/push out actuation button 75 and the battery door 81. This enables the insect zapper 21 to be easily manipulated and maintained in a number of positions without undue manual or wrist stress.

FIG. 3 is an exploded view of the insect zapper 21 seen in FIG. 2 and illustrating further details of the internals and grid assembly. As can be seen at the left side of the drawing, the insect zapper 21 has been exploded around an exploded grid assembly 51.

Now separated, the different structures of the grid assembly 51 are seen. At the center of the grid assembly, the center grid 35 is now clearly seen. As before the central grid 35 has a main mesh extent 91 having a parallelogram shaped mesh opening of about four millimeters wide between wire having an effective diameter of about 0.33 millimeters. The central grid has an end portion 93 which is an extension of the central grid 35 and which extends toward the narrow slot 31 seen in FIG. 1 and which can be seen in exploded halves in FIG. 3. End portion 93 of central grid 35 is preferably a solid plate, since the edge contact of the central grid 35 available within the slot 31 will maximize contact if it is a plate. If the end portion 93 were a continuation of the grid, it would simply present as a series of needles having an average projection length of about two millimeters. Flying insects would have a reduced chance of contacting a mesh projection and another object to complete the circuit.

Above the central grid 35 a plastic insulator grid 101 is seen. The plastic insulator grid 101 can be provided as a separate structure, or a structure attached, fused or extending through the main mesh extent 91 of the. The plastic insulator grid 101 is seen to have a decorative pattern. The main objectives of the design of plastic insulator grid 101 is to provide enough separation between a first ground grid 109 located above main mesh grid 35 with sufficient minimum space of the structural portions of plastic insulator grid 101 that shorting of the main mesh grid 35 and first ground grid 109 will be inhibited upon normal handling.

The first ground grid 109 has a main mesh extent 111 which may be as a criss-cross pattern and may be similar to the main mesh grid 35 has an end portion 113 which is preferably a solid plate, since the main mesh extent 111 available lateral to the end portion 93 of the main mesh grid 35 will be maximized if the end portion 113 is a plate. The insect has a much better chance of making electrical contact between two plates rather than between a plate and a grid (such the main mesh extent 109) especially where the grid would have its end edge and short length covered by the grid support portion 25.

Similarly below the center grid 35 a second plastic insulator grid 121 is seen. The second plastic insulator grid 121 may or may not follow the overall shape of the first plastic insulator grid 101, and may or may not be connected to the first plastic insulator grid 101 through the grid openings in the center grid 35. Plastic insulator grid 101 is preferably provides about 5 mm of separation between the center grid 35 and first ground grid 109. However, it may be preferred to form first and second plastic insulator grids 101 and 121 simultaneously around and onto center grid 35 to form a center grid and insulator assembly 123. If this method of manufacture is chosen, and if the first and second plastic insulator grids 101 and 121 have a matching or shadowing relationship, several benefits result. First, center grid 35 plus insulator grids 101 and 121 assembly resulting from this will have maximum area contact between the insulator grids 101 and 121. This causes the center grid 35 to be significantly stiffened. Second, in terms of access through the center grid 35 by either passage of air or insect parts, the flow area will be maximized. There will be no insect body parts or air for which penetration is stopped by an unsupported insulator, either from the top or from the bottom. Put another way, the extent that the first insulator grid 101 blocks any open mesh which would other wise occur in center grid 35, the second insulator grid provides not more blocking as it only takes up a profile which is already blocked. The total air flow through the center grid is thereby minimally lessened. Third, the insulator grids 101 and 121 are stabilized against movement. If someone pushed on the first ground grid 109 in one area, a portion of the insulator grid 101 might tend to move to accommodate the pressure. The integrated insulator assembly 123 will have both the insulator grids 101 and 121 projecting away from the center grid 35 by about five millimeters to each side of the center grid 35.

Below the second insulator grid 121, a second ground grid 129 is seen. Second ground grid 129 may or may not preferably be identical to the first ground grid 109, both to create a savings by using duplicated parts, as well as to enable the same performance with the insect zapper 21 when waved in one direction as when waved in the other direction. Second ground grid 129 has a main mesh extent 131 and similar to the first ground grid 109 has an end portion 133 which is preferably a solid plate, since the main mesh extent 131 available lateral to the end portion 93 of the main mesh grid 35 will be maximized if the end portion 133 is a plate. It is because the insulator assembly 123 provides such a standoff of the first and second ground grids 109 and 121 that it is almost impossible to inadvertently press the first and second ground grids 109 and 121 into contact with the central grid 35. Having a pair of ground grids 109 and 121 as the two outside s metal plates also act as a safety for users when both sides are grasped with the user's hands.

The upper half of the grid support portion 25 includes an extended fitting portion 141 which will interfit with an upper portion of the handle 23 which contains the battery door 81, while the lower half of the grid support portion 25 includes an extended fitting portion 143 which is shown in interfitted position with a lower portion of the handle 23. Both the extended fitting portion 141 and 143 include a set of through openings 145 to lighten the insect zapper 21 and for aesthetic purposes. The terms "upper" and "lower" only relate to the orientation as seen in FIG. 3.

The lower portion of the handle 23 is seen to support a circuit board 151 adjacent to a first battery clip 153. A pair of batteries 155 and 157 are shown in phantom, and then a second battery clip 159. It is readily seen that the battery door 81 is the length of about 1.25 of the combined length of the batteries 155 and 157 such that the batteries 155 and 157 would be loaded in one at a time and positioned against the battery clips 153 and 159.

The circuit board 151 performs several functions. First it is able to take the power from two batteries 155 and 157, nominally about 3.0 volts, and boost the voltage to about 2400 volts DC, but at a low current. The current is enough to vaporize the insect and its small body. Secondly, the circuit board provides a support structure for the slide switch 71 and the push in/push out actuation button 75. Push in/push out actuation button 75 energizes the high voltage output over three output wires. A first ground output wire 171 is connected to second ground grid 129, typically by some joining structure such as a rivet or flattened eyelet. Similarly, a second ground output wire 173 is connected to first ground grid 109. Both the ground output wires 171 and 173 are connected to a ground terminal 175 on the circuit board 151. A high potential terminal 177 of the circuit board 151 is connected by a wire 179 to the high potential center grid 35.

A pair of LED light power wires including wires 183 and 185 extend from the circuit board 151 to the light housing 64, and connect to the LED 65. The upper and lower halves of the handle 23 are joined together typically using screws or threaded members (not shown). The joining of the portions of the handle 23 also sandwich the extended fitting portions 141 and 143 of the halves of the grid support portion 24 together. The combination of extended fitting portions 141 and 143 plus a reinforced central grid and integral combination plastic insulator grids 101 and 121 formed as a unit, make the insect zapper 21 quite sturdy.

Referring to FIG. 4, an end view of the insect zapper 21 is seen and which illustrates the profile of the light housing 63 and LED 65. Referring to FIG. 5, a plan view of the insect zapper 21, shown with bait support structure 55 in place gives a good overall view of the assembled embodiment shown in exploded view in FIG. 3. The structure of the second plastic insulator grid 121 is seen, and because it is preferably formed integrally with the first plastic insulator grid 109, they are continuous with each other through the center grid 35. As a plan view, if the first and second ground grids 109 and 129 are identical, they will also align and appear as a single grid in FIG. 5.

Two other features not previously seen includes a series of projections from the handle 23 as a grip 191. Grip 191 si helpful when the insect zapper 21 is held near the butt end 87, especially when reaching into a corner. At the butt end 87 a holding strap eyelet 195 is seen to assist either in manual retention onto the user's arm or for hanging the insect zapper 21 in a position for non-manual use.

Some further detail of the bait support structure 55 is seen including a projection 197 which fits through an aperture 199. The corresponding projection 197 and aperture 199 for the other end of the bait support structure 55 is only viewable at the rear side of insect zapper 21 as it is shown in FIG. 5. The projection 197 can be disengaged from the aperture 199 to enable bait support structure 55 to be disassembled into two pieces and removed from insect zapper 21.

Referring to FIG. 6, a plan view of the side of the insect zapper 21 opposite that shown in FIG. 5. FIG. 6 illustrates the existence of an optional power indicator light 201. Since the insect zapper 21 makes no discernible noise when running, it is difficult to ascertain whether the unit is "on" from a distance. When employed in non manual use, such as being suspended, or even in manual use, a quick glance at the power indicator light 201 can give an instant indication of whether or not the insect zapper is on, especially to help inhibit battery drain and to increase care of handling whenever the insect zapper 21 enters an environment or circumstances in which conductive objects might enter the grid area.

Referring to FIG. 7, a side view gives some indication of the overall shape of the insect zapper 21. It can also be seen that the raised rail 61 of the bait support structure 55 extends about its periphery. The side view of FIG. 7 also gives a more accurate view of the profile of the narrow slot 31 and the spacing of the center grid 35 within it. The end portions 113 and 133 of the ground grids 109 and 129, respectively cannot be seen as they lie adjacent the center grid 35 and are covered by the grid support portion 25 from the viewpoint of FIG. 6.

While the present invention has been described in terms of a lightweight portable battery powered insect destruction device with capability of manually bringing a shock grid to the insect while providing safety operation, one skilled in the art will realize that the structure and techniques of the present invention can be applied to many appliances and especially appliances which utilize the embodiments of the invention or any process which utilizes the apparatus and steps of the invention.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. In an insect destruction device including
a housing having a handle portion extending from a grid support portion, said grid support portion defining a perimetric sidewall;
a battery power source supported within said housing;
a high voltage converter circuit having an input electrically connected to the battery power source and high voltage output including at least a ground conductor and at least a powered conductor;
a central grid having a first side and a second side, said central grid electrically connected to said powered conductor;
a first ground grid located adjacent and spaced apart from said first side of said central grid and electrically connected to said ground conductor;
a second ground grid located adjacent and spaced apart from said second side of said central grid and electrically connected to said ground conductor, said central and said first and said second ground grids coupled to and supported by said grid support portion of said housing;
said grid support portion defining a first grid support opening disposed within said sidewall adjacent to and exposing said first ground grid, said sidewall forming a first support surface spaced from said first ground grid, and said grid support portion defining a second grid support opening disposed within said sidewall adjacent to and exposing said second ground grid, said sidewall forming a second support surface spaced from said second ground grid,
the improvement comprising:
a slot extending through said grid support portion sidewall, said slot disposed between said first support surface and said second support surface and opposite said handle portion, said slot exposing said central grid.

2. An insect destruction device according to claim 1, the improvement further comprising:
a light emitting diode switchably connected to said battery power source, said light emitting diode disposed at an end of the handle portion of the housing and configured to cast light onto at least one of said first ground grid and said second ground grid.

3. The insect destruction device as recited in claim 2 wherein said illuminating light emitting diode is operable independently of the high voltage converter.

4. The insect destruction device of claim 2 with a power indicator light to provide a positive recognition during operation of the high voltage converter circuit.

5. The insect destruction device as recited in claim 1 and further comprising a bait support structure engaging the grid support portion and across at least one of said first grid opening and said second grid opening.

6. The insect destruction device as recited in claim 1 wherein said battery power source is carried within said handle portion.

7. The insect destruction device as recited in claim 1 wherein the housing has an overall racquet shape.

8. The insect destruction device of claim 1 and further comprising:
a first plastic insulator grid interposed between said central grid and said first ground grid to provide about 5 mm of separation between said center grid and said first ground grid; and
a second plastic insulator grid interposed between said central grid and said second ground grid to provide about 5 mm of separation between said center grid and said second ground grid.

* * * * *